(12) United States Patent
Toyoda et al.

(10) Patent No.: US 11,313,008 B2
(45) Date of Patent: Apr. 26, 2022

(54) STEEL MEMBER AND PRODUCTION METHOD THEREFOR

(71) Applicant: JFE Steel Corporation, Tokyo (JP)

(72) Inventors: Shunsuke Toyoda, Tokyo (JP); Ichiro Sugimoto, Tokyo (JP); Shuji Kawamura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 90 days.

(21) Appl. No.: 16/500,617

(22) PCT Filed: Mar. 29, 2018

(86) PCT No.: PCT/JP2018/013077
§ 371 (c)(1),
(2) Date: Oct. 3, 2019

(87) PCT Pub. No.: WO2018/186274
PCT Pub. Date: Oct. 11, 2018

(65) Prior Publication Data
US 2020/0190615 A1 Jun. 18, 2020

(30) Foreign Application Priority Data
Apr. 7, 2017 (JP) .............................. JP2017-076412

(51) Int. Cl.
*C22C 38/00* (2006.01)
*C22C 38/14* (2006.01)
(Continued)

(52) U.S. Cl.
CPC .................. *C21D 9/08* (2013.01); *B32B 1/08* (2013.01); *B32B 15/011* (2013.01); *C21D 8/021* (2013.01);
(Continued)

(58) Field of Classification Search
CPC ... C21D 9/08; C21D 9/46; C21D 9/50; C21D 8/10; C21D 8/021; C21D 8/0226;
(Continued)

(56) References Cited

U.S. PATENT DOCUMENTS 7,887,649 B2   2/2011   Toyoda et al.
7,935,197 B2   5/2011   Ishikawa et al.
(Continued)

FOREIGN PATENT DOCUMENTS

CN   1628183 A   6/2005
CN   1756853 A   4/2006
(Continued)

OTHER PUBLICATIONS

Machine Translation, Noro, JP 2010-126730 A, Jun. 2010. (Year: 2010).*
(Continued)

*Primary Examiner* — Michael E. La Villa
(74) *Attorney, Agent, or Firm* — RatnerPrestia (57) ABSTRACT

A steel member, a hot-rolled steel sheet to be used as a material thereof, and production methods therefor are provided. A steel member contains 0.010% to 0.120% Ti, in which 0.005% or more of Ti is precipitated as a precipitate having a particle size of 20 nm or less in the microstructure. A hot-rolled steel sheet for the steel member contains 0.010% to 0.120% Ti, in which 0.005% or more of Ti is present as dissolved Ti in the microstructure. A method for producing the steel member includes subjecting a hot-rolled steel sheet to forming processing and then performing heat treatment including heating to a temperature of higher than 550° C. and 1,050° C. or lower and then cooling at an average cooling rate of 10° C./s or more in the temperature range of 550° C. to 400° C.

6 Claims, 1 Drawing Sheet (51) Int. Cl.
*C22C 38/02* (2006.01)
*C22C 38/04* (2006.01)
*C22C 38/12* (2006.01)
*C22C 38/16* (2006.01)
*C22C 38/06* (2006.01)
*C22C 38/54* (2006.01)
*C21D 9/08* (2006.01)
*C21D 8/02* (2006.01)
*C21D 8/10* (2006.01)
*C21D 9/46* (2006.01)
*C21D 9/50* (2006.01)
*C22C 38/60* (2006.01)
*C22C 38/42* (2006.01)
*C22C 38/44* (2006.01)
*C22C 38/08* (2006.01)
*C22C 38/20* (2006.01)
*C22C 38/40* (2006.01)
*C22C 38/46* (2006.01)
*C22C 38/22* (2006.01)
*C22C 38/24* (2006.01)
*C22C 38/28* (2006.01)
*B32B 15/01* (2006.01)
*C22C 38/18* (2006.01)
*C22C 38/48* (2006.01)
*C22C 38/26* (2006.01)
*C22C 38/50* (2006.01)
*B32B 1/08* (2006.01)
*F16L 9/17* (2006.01)
*F16L 9/16* (2006.01)
*F16L 9/02* (2006.01)

(52) U.S. Cl.
CPC ............. *C21D 8/0226* (2013.01); *C21D 8/10* (2013.01); *C21D 9/46* (2013.01); *C21D 9/50* (2013.01); *C22C 38/00* (2013.01); *C22C 38/001* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *F16L 9/02* (2013.01); *F16L 9/165* (2013.01); *F16L 9/17* (2013.01); *Y10T 428/12958* (2015.01); *Y10T 428/12965* (2015.01); *Y10T 428/12972* (2015.01)

(58) Field of Classification Search
CPC ....... C22C 38/00; C22C 38/60; C22C 38/001; C22C 38/008; C22C 38/02; C22C 38/04; C22C 38/06; C22C 38/12; C22C 38/14; C22C 38/16; C22C 38/54; C22C 38/08; C22C 38/18; C22C 38/20; C22C 38/22; C22C 38/24; C22C 38/26; C22C 38/28; C22C 38/40; C22C 38/42; C22C 38/44; C22C 38/46; C22C 38/48; C22C 38/50; Y10T 428/12965; Y10T 428/12972; Y10T 428/12958; B32B 1/08; B32B 15/011; F16L 9/02; F16L 9/165; F16L 9/17
See application file for complete search history.

(56) References Cited

U.S. PATENT DOCUMENTS

| | | | |
|---|---|---|---|
| 10,106,873 | B2 | 10/2018 | Sakurada et al. |
| 2005/0014015 | A1 | 1/2005 | Hauger |
| 2006/0096678 | A1 | 5/2006 | Kariya |
| 2007/0119521 | A1 | 5/2007 | Yokota et al. |
| 2014/0305550 | A1 | 10/2014 | Ariga et al. |
| 2015/0004050 | A1 | 1/2015 | Matsuki et al. |
| 2016/0222483 | A1* | 8/2016 | Murakami ............... C21D 1/20 |
| 2016/0222485 | A1* | 8/2016 | Murakami .............. C22C 38/18 |
| 2020/0190618 | A1* | 6/2020 | Toyoda ................. C22C 38/002 |

FOREIGN PATENT DOCUMENTS

| | | | |
|---|---|---|---|
| CN | 101484602 A | | 7/2009 |
| CN | 103917680 A | | 7/2014 |
| CN | 104066861 A | | 9/2014 |
| JP | 3491339 B2 | | 1/2004 |
| JP | 2009191360 A | | 8/2009 |
| JP | 2010-126730 A | * | 6/2010 |
| JP | 5196934 B2 | | 5/2013 |
| JP | 5494895 B2 | | 5/2014 |
| JP | 2016204690 A | | 12/2016 |
| JP | 2017186634 A | | 10/2017 |
| KR | 20160042070 A | | 4/2016 |

OTHER PUBLICATIONS

Chinese Office Action for Chinese Application No. 201880023621.8, dated Apr. 6, 2021, with Concise Statement of Relevance of Office Action, 6 pages.
International Search Report and Written Opinion for International Application No. PCT/JP2018/013077 dated Jul. 3, 2018, 6 pages.
Korean Office Action for Korean Application No. 10-2019-7028865, dated Jan. 4, 2021, with Concise Statement of Relevance of Office Action, 7 pages.
Korean Office Action for Korean Application No. 10-2019-7028865, dated May 14, 2021, with Concise Statement of Relevance of Office Action, 5 pages.
Canadian Office Action for Canadian Application No. 3,057,815, dated Jan. 19, 2021, 3 pages.
Chinese Office Action for Chinese Application No. 201880023621.8, dated Oct. 19, 2020, with translation, 18 pages.
Japanese Office Action for Japanese Application No. 2018-536533, dated May 28, 2019 with Concise Statement of Relevance of Office Action, 6 pages.

* cited by examiner

STEEL MEMBER AND PRODUCTION METHOD THEREFOR

CROSS REFERENCE TO RELATED APPLICATIONS

This is the U.S. National Phase application of PCT/JP2018/013077, filed Mar. 29, 2018, which claims priority to Japanese Patent Application 2017-076412, filed Apr. 7, 2017, the disclosures of these applications being incorporated herein by reference in their entireties for all purposes.

FIELD OF THE INVENTION

The present invention relates to steel members, hot-rolled steel sheets for the steel members, and production methods therefor. Specifically, the present invention relates to a steel member having good fatigue crack growth resistance properties in a plastic strain range, a hot-rolled steel sheet for the steel member, and production methods therefor. The present invention relates to welded steel pipes for coiled tubing, welded steel pipes for line pipes, and welded steel pipes for automotive structural members, and in particular relates to welded steel pipes for coiled tubing. These welded steel pipes are required to have high strength and fatigue resistance properties in a plastic strain range. The present invention more particularly relates to an improvement in the fatigue crack growth resistance properties of such steel members in the plastic strain range.

BACKGROUND OF THE INVENTION

Patent Literature 1 discloses a method for producing a high-tensile-strength electric resistance welded steel pipe having a yield strength of 700 MPa or more, a tensile strength of 800 MPa or more, and ductility, i.e., an elongation of 15% or more after pipe making, the pipe being used for high-strength structural members and driving force transmission members for automobiles and as an electric resistance welded pipe for cleaning oil country tubular goods. According to this method, it is possible to provide a high-tensile-strength electric resistance welded steel pipe whose heat-affected zone is not softened because the pipe contains 0.09% to 0.18% C and predetermined amounts of alloying elements of Cu, Ni, Cr, and Mo. However, the pipe disadvantageously has short durability life in repeated use as a steel pipe for fatigue applications, in particular, a steel pipe for coiled tubing required to have fatigue resistance properties in a plastic strain range.

Patent Literature 2 discloses a steel strip for coiled tubing, the steel strip having good uniformity in material quality, and a method for producing the steel strip. According to this method, a steel strip for coiled tubing, the steel strip having low variations in yield strength in the width and longitudinal directions of a coil, can be provided because the steel strip contains 0.10% to 0.16% C and predetermined amounts of alloying elements of Cr, Cu, Ni, Mo, Nb, and Ti. However, the steel strip disadvantageously has insufficient fatigue resistance properties and low durability life in repeated use.

Patent Literature 3 discloses a hardened and tempered steel pipe having good fatigue life as a steel pipe for machine structures such as automobiles, in particular, as a hollow stabilizer for automobiles. According to this method, it is possible to provide a steel pipe having long fatigue life because the steel pipe has a predetermined chemical composition, a precipitated carbide has an average particle size of 0.5 µm or less, and a central portion in the thickness direction has a hardness of 400 HV. However, the level of the fatigue life of the steel pipe is a life of several tens of thousands cycles in a low stress-high cycle elastic region fatigue properties. Coiled tubing is used several hundred times while repeatedly inserted into and recovered from a well. When a pipe is uncoiled, coiled, and inserted into a well, a strain of about 2% in a plastic range is applied to a curved (gooseneck) portion; thus, the pipe is required to have a high strain-low cycle fatigue strength of 100 to 1,000 cycles. Typically, fatigue strength under conditions of constant stress amplitude, such as elastic range fatigue, is increased by increasing material strength. The longitudinal strain applied to the coiled tubing corresponds to a constant strain condition determined by the inner diameter of the coil and the gooseneck, and the contribution of the fatigue ductility coefficient of what is called the Morrow equation is large. Thus, an increase in strength does not necessarily lead to an improvement in life to fail to provide desired fatigue resistance properties in a plastic strain range.

PATENT LITERATURE

PTL 1: Japanese Patent No. 3491339
PTL 2: Japanese Patent No. 5494895
PTL 3: Japanese Patent No. 5196934

SUMMARY OF THE INVENTION

It is an object according to aspects of the present invention to provide a steel member having good fatigue crack growth resistance properties in a plastic strain range, a hot-rolled steel sheet to be used as a material thereof, and production methods therefor.

The phrase "good fatigue crack growth resistance properties in a plastic strain range" or "good in terms of fatigue crack growth resistance properties in a plastic strain range" used in accordance with aspects of the present invention indicates that when a tensile fatigue test is performed under conditions of a tensile mode, a strain control mode, a strain ratio of 0, and a total strain range of 2.0%, the number of cycles from a 12.5% decrease in load to a 25% decrease in load relative to the initial load is 100 cycles or more. In coiled tubing applications, the form of a fatigue crack is also important because a product that has reached fatigue life in an oil well is withdrawn and recovered. A fatigue crack needs to be formed not in a fracture mode but in a pinhole leak mode. The phrase "good fatigue crack growth resistance properties in a plastic strain range" or "good in terms of fatigue crack growth resistance properties in a plastic strain range" used in accordance with aspects of the present invention refers to properties corresponding to the formation of the fatigue crack in the leak mode.

A hot-rolled steel sheet serving as a material of a steel member according to aspects of the present invention also refers to a "material hot-rolled steel sheet".

Examples of the steel member according to aspects of the present invention include steel pipes such as welded steel pipes and formed components such as automotive structural members. Examples of the welded steel pipes include welded steel pipes for coiled tubing, welded steel pipes for line pipes, and welded steel pipes for automotive structural members.

The inventors have conducted systematic experiments and examinations using different chemical compositions under different production conditions of a hot-rolled steel sheet serving as a material in order to achieve a balance between strength and fatigue crack growth resistance properties, which are conflicting properties, at a high level, and have found that a steel member having both of high strength and good fatigue crack growth resistance properties in a plastic strain range is obtained by hot-rolling a steel having a specific chemical composition at specific temperature processing conditions or forming a steel having a specific chemical composition into a steel pipe and then performing heat treatment under specific conditions.

Aspects of the present invention have been accomplished in light of these findings and include configurations described in [1] to [9] below.

[1] A steel member contains, on a percent by mass basis, 0.010% to 0.120% Ti, in which 0.00% or more of Ti is precipitated as a precipitate having a particle size of 20 nm or less in the microstructure.

[2] In the steel member described in [1], the steel member has a composition containing, on a percent by mass basis, C: 0.06% to 0.30%, Si: 0.002 to 1.5%, Mn: 0.4% to 2.5%, Al: 0.01% to 0.19%, Cr: 0.001% to 0.90%, B: 0.0001% to 0.0050%, Ti: 0.010% to 0.120%, P: 0.019% or less (including 0%), S: 0.015% or less (including 0%), N: 0.008% or less (including 0%), O: 0.003% or less (including 0%), and Sn: 0.10% or less (including 0%), the balance being Fe and incidental impurities.

[3] The steel member described in [2] further contains, on a percent by mass basis, one or two or more selected from Nb: 0.001% to 0.15%, V: 0.001% to 0.15%, W: 0.001% to 0.15%, Mo: 0.001% to 0.45%, Cu: 0.001% to 0.45%, Ni: 0.001% to 0.45%, Ca: 0.0001% to 0.005%, and Sb: 0.0001% to 0.10%, in addition to the composition.

[4] In the steel member described in any of [1] to [3], the steel member is a welded steel pipe.

[5] A hot-rolled steel sheet for the steel member described in any of [1] to [4] contains, on a percent by mass basis, 0.010% to 0.120% Ti, in which 0.005% or more of Ti is present as dissolved Ti in the microstructure.

[6] In the hot-rolled steel sheet for the steel member described in [5], a leading end portion and a trailing end portion are both end portions in a longitudinal direction, and each of the leading end portion and the trailing end portion has a thickness 5% to 50% larger than a central portion in the longitudinal direction.

[7] A method for producing the steel member described in any of [1] to [4] includes subjecting a hot-rolled steel sheet to forming processing, the hot-rolled steel sheet containing, on a percent by mass basis, 0.010% to 0.120% Ti, 0.005% or more of Ti being present as dissolved Ti in a microstructure, and then performing heat treatment including heating to a temperature of higher than 550° C. and 1,050° C. or lower and then cooling at an average cooling rate of 10° C./s or more in the temperature range of 550° C. to 400° C.

[8] In the method for producing the steel member described in [7], the hot-rolled steel sheet is produced by, after performing slab extraction of a steel slab containing, on a percent by mass basis, 0.010% to 0.120% Ti at a temperature higher than an equilibrium dissolution temperature $T_{Ti}$ calculated from formula (1) below, completing finish rolling at a temperature equal to or higher than $T_{Ti}$-400° C., performing cooling at an average cooling rate of 10° C./s or more in the temperature range of $T_{Ti}$-400° C. to $T_{Ti}$-500° C., and performing coiling at a temperature equal to or lower than $T_{Ti}$-500° C., $$\log([Ti-N\times48\div14][C])=-7,000/(T_{Ti}(° C.)+273)+2.75 \quad (1)$$

where Ti, N, and C in formula (1) indicate contents (% by mass) of respective elements in the steel slab.

[9] A method for producing the hot-rolled steel sheet described in [5] or [6] includes after performing slab extraction of a steel slab containing, on a percent by mass basis, 0.010% to 0.120% Ti at a temperature higher than an equilibrium dissolution temperature $T_{Ti}$ calculated from formula (1) below, completing finish rolling at a temperature equal to or higher than $T_{Ti}$-400° C., performing cooling at an average cooling rate of 10° C./s or more in the temperature range of $T_{Ti}$-400° C. to $T_{Ti}$-500° C., and performing coiling at a temperature equal to or lower than $T_{Ti}$ 500° C., $$\log([Ti-N\times48\div14][C])=-7,000/(T_{Ti}(° C.)+273)+2.75 \quad (1)$$

where Ti, N, and C in formula (1) indicate contents (% by mass) of respective elements in the steel slab.

According to aspects of the present invention, it is possible to provide the steel member having good fatigue crack growth resistance properties in the plastic strain range. The hot-rolled steel sheet according to aspects of the present invention is particularly suitable as a material of the steel member.

According to aspects of the present invention, it is possible to provide the steel member that achieves a balance between strength and fatigue crack growth resistance properties, which are conflicting properties, at a high level. Thus, as the steel member according to aspects of the present invention, in particular, welded steel pipes for coiled tubing, welded steel pipes for line pipes, and welded steel pipes for automotive structural members, which are required to have high strength and fatigue resistance properties in the plastic strain range, are suitable. Among these, welded steel pipes for coiled tubing are suitable.

Figure 1:
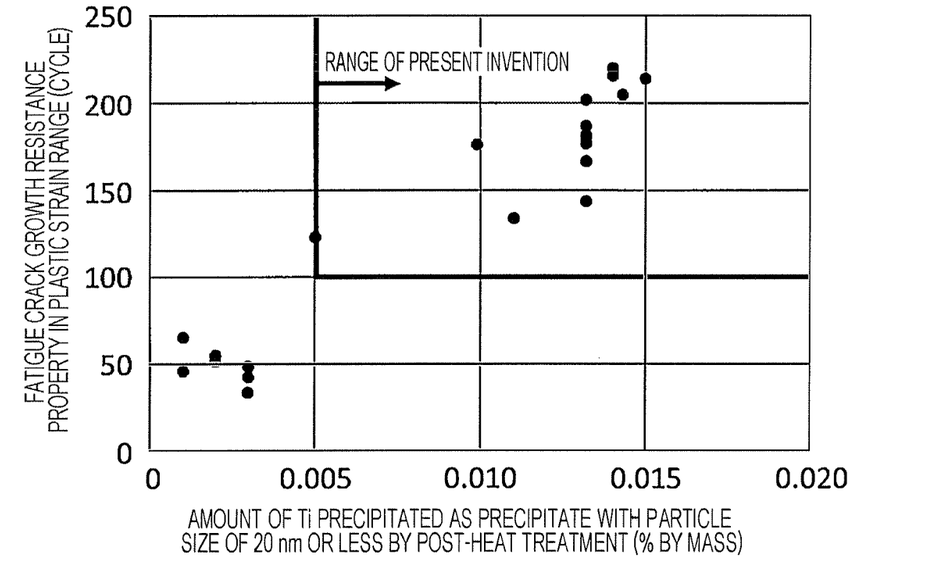
The FIGURE illustrates the relationship between the amount of Ti precipitated as precipitates with a particle size of 20 nm or less by post-heat treatment and fatigue crack growth resistance properties in a plastic strain range.

DETAILED DESCRIPTION OF EMBODIMENTS OF THE INVENTION (Steel Member)

A steel member according to aspects of the present invention is obtained by subjecting a hot-rolled steel sheet to forming processing, the hot-rolled steel sheet (material hot-rolled steel sheet) having been produced by hot rolling under specific temperature processing conditions, and then performing heat treatment under specific conditions. Hereinafter, the heat treatment after the forming processing of the material hot-rolled steel sheet also referred to as "post-heat treatment".

The reason for the limitation of the chemical composition range of the steel member according to aspects of the present invention will be described below. Hereinafter, "% by mass" used in a composition is simply denoted by "%".

Ti: 0.010% to 0.120%

Ti precipitates as carbonitride in a hot-rolling step to inhibit grain growth due to recovery and recrystallization in the hot-rolling step. The presence of Ti is effective in providing a fine ferrite phase having a desired grain size (1 to 50 μm) in the structure (microstructure) of the material hot-rolled steel sheet. The refinement of the microstructure in the material hot-rolled steel sheet leads to the refinement of the microstructure after heat treatment subsequent to forming processing (cold working) such as pipe making or parts forming, thereby providing good fatigue crack growth resistance properties in a plastic strain range.

Tanaka et al. propose a model in which dislocations are irreversibly piled up on a slip plane due to fatigue cycles, and an initial crack is generated when a stress generated at this time exceeds a critical stress (literature: K. Tanaka and T. Mura: J Appl. Mech., Vol. 48, p. 97-103 (1981)). According to this model, when material physical properties such as G: a transverse elastic constant, Ws: fracture energy per unit area, v: the Poisson's ratio, $\Delta\tau$: a resolved shear stress range on a slip plane, and k: a frictional force of dislocations on a slip plane, external force conditions, and so forth are constant, a shorter slip-plane length d, i.e., a smaller grain size, results in a longer fatigue crack initiation cycle, Nc, of each grain.

Due to such a mechanism, the refined microstructure material according to aspects of the present invention will exhibit good fatigue crack growth resistance properties in the plastic strain range because of low stress concentration of a generated fatigue crack.

Additionally, Ti is an essential element that improves strength after heat treatment subsequent to forming processing such as pipe making or parts forming and that significantly improves fatigue strength by enhancing the precipitation strengthening of a matrix in the form of carbide, solid-solution strengthening as a solid-solution element, and transformation structure strengthening as a hardenability-improving element. These effects are obtained when the Ti content is in the range of 0.010% to 0.120%. If the Ti content is lower than the lower limit of the above range, 0.005% or more of Ti is present as dissolved Ti in the stage of the material hot-rolled steel sheet described below. Thus, 0.005% or more of Ti cannot be precipitated as fine precipitates having a particle size of 20 nm or less by the heat treatment subsequent to the forming processing, thereby failing to provide the foregoing effects. If the Ti content is more than the upper limit of the above range, coarse TiN is formed to degrade the fatigue resistance properties. Accordingly, the Ti content is in the range of 0.010% to 0.120%.

In the microstructure of the steel member according to aspects of the present invention, 0.005% or more of Ti is precipitated as precipitates having a particle size of 20 nm or less.

The inventors have found that in the case where a hot-rolled steel sheet is used as a material as in accordance with aspects of the present invention and where fatigue resistance properties in a plastic strain range are required after heat treatment (post-heat treatment) subsequent to forming processing such as pipe making or parts forming, 0.005% or more of Ti is precipitated as fine precipitates having a particle size of 20 nm or less by the post-heat treatment to provide excellent fatigue crack growth resistance properties in the plastic strain range. The FIGURE illustrates the relationship between the amount (% by mass) of Ti precipitated as the fine precipitates having a particle size of 20 nm or less by the post-heat treatment and the fatigue crack growth resistance properties in the plastic strain range. In the case where the amount of Ti precipitated as the fine precipitates having a particle size of 20 nm or less by the post-heat treatment is 0.005% or more, when a tensile fatigue test is performed under conditions of a tensile mode, a strain control mode, a strain ratio of 0, and a total strain range of 2.0%, the number of cycles from a 12.5% decrease in load to a 25% decrease in load relative to the initial load is 100 cycles or more. That is, good fatigue crack growth resistance properties in the plastic strain range are provided.

A preferred composition of the steel member according to aspects of the present invention will be described below.

C: 0.06% to 0.30%

In accordance with aspects of the present invention, C is an element that ensures high strength by post-heat treatment under specific conditions and that binds to Ti during the post-heat treatment and is precipitated as fine precipitates particularly in a surface layer portion to improve the fatigue crack growth resistance properties in the plastic strain range. At a C content of less than 0.06%, desired strength (YS≥770 MPa) and fatigue crack growth resistance properties in the plastic strain range are difficult to obtain. At a C content of more than 0.30%, the toughness and weldability of the steel member such as a steel pipe cannot be ensured; thus, the upper limit of the C content is set thereto. More preferably, the C content is 0.10% or more. More preferably, the C content is 0.28% or less.

Si: 0.002% to 1.5%

Si is an element that improves the fatigue crack growth resistance properties in the plastic strain range while ensuring desired strength by solid-solution strengthening. A Si content of less than 0.002% results in insufficient strength. A Si content of more than 1.5% results in a decrease in weldability. Accordingly, the Si content is preferably limited to 0.002% to 1.5%. More preferably, the Si content is 0.05% or more. More preferably, the Si content is 0.35% or less.

Mn: 0.4% to 2.5%

Mn serves to ensure desired strength owing to low-temperature transformation strengthening during the post-heat treatment to improve the fatigue crack growth resistance properties in the plastic strain range. At a Mn content of less than 0.4%, the effect is not sufficiently provided. At a Mn content of more than 2.5%, the weldability deteriorates. Accordingly, the Mn content is preferably limited to 0.4% to 2.5%. More preferably, the Mn content is 1.09% or more. More preferably, the Mn content is 1.99% or less.

Al: 0.01% to 0.19%

Al is a deoxidizing element during steel making and serves to inhibit the growth of austenite grains in the hot-rolling step, refine grains, provide desired ferrite grain size (1 to 50 µm) after the post-heat treatment, and improve the fatigue crack growth resistance properties in the plastic strain range. An Al content of less than 0.01% does not result in these effects, thereby increasing the ferrite grain size. An Al content of more than 0.19% results in the deterioration of the weldability. Additionally, oxide inclusions tend to be increased to decrease the fatigue resistance properties. More preferably, the Al content is 0.041% or more. More preferably, the Al content is 0.080% or less.

Cr: 0.001% to 0.90%

Cr serves to ensure desired strength by low-temperature transformation strengthening during the post-heat treatment to improve the fatigue crack growth resistance properties in the plastic strain range. At a Cr content of less than 0.001%, the effect is not sufficiently provided. At a Cr content of more than 0.90%, the weldability deteriorates. Accordingly, the Cr content is preferably limited to 0.001% to 0.90%. More preferably, the Cr content is 0.001% to 0.19%.

B: 0.0001% to 0.0050%

B serves to ensure desired strength by low-temperature transformation strengthening during the post-heat treatment to improve the fatigue crack growth resistance properties in the plastic strain range. At a B content of less than 0.0001%, the effect is not sufficiently provided. At a B content of more than 0.0050%, the fatigue resistance properties tend to decrease. Accordingly, the B content is preferably limited to 0.0001% to 0.0050%. More preferably, the B content is 0.0005% or more. More preferably, the B content is 0.0035% or less.

P: 0.019% or Less (Including 0%)

P decreases the fatigue crack growth resistance properties in the plastic strain range and deteriorates the electric resistance weldability by solidification co-segregation with Mn. At a P content of more than 0.019%, the adverse effects are markedly provided. Thus, the upper limit thereof is preferably 0.019%.

S: 0.015% or Less (Including 0%)

S is present as inclusions in steel in the form of, for example, MnS and acts as a starting point of a fatigue crack in the plastic strain range to deteriorate the fatigue resistance properties. At a S content of more than 0.015%, the adverse effect is markedly provided. Thus, the upper limit thereof is preferably 0.015%. More preferably, the S content is 0.005% or less.

N: 0.008% or Less (Including 0%)

N forms TiN and precipitates as coarse precipitates, thereby consuming dissolved Ti. Thus, N decreases the effect in which excellent fatigue crack growth resistance properties in the plastic strain range is obtained by the fact that the addition of Ti allows 0.005% or more of Ti to be present as dissolved Ti in the stage of the material hot-rolled steel sheet and that 0.005% or more of Ti is precipitated as fine precipitates having a particle size of 20 nm or less by heat treatment subsequent to forming processing. At a N content of more than 0.008%, the adverse effect is markedly provided. The upper limit thereof is preferably 0.008%. More preferably, the N content is 0.0049% or less.

O: 0.003% or Less (Including 0%)

O is present as oxide inclusions and decreases the fatigue resistance properties of steel. At an O content of more than 0.003%, the adverse effect is markedly provided. Thus, the upper limit thereof is preferably 0.003%. More preferably, the O content is 0.002% or less.

Sn: 0.10% or Less (Including 0%)

Sn is present as a dissolved element and decreases the hot ductility of steel. At a Sn content of more than 0.10%, the adverse effect is markedly provided. Thus, the upper limit thereof is preferably 0.10%. More preferably, the Sn content is 0.03% or less.

The balance is Fe and incidental impurities. In accordance with aspects of the present invention, the following elements may be further added in order to improve the advantageous effects according to aspects of the present invention.

Nb: 0.001% to 0.15%

Nb precipitates as carbide, is effective in inhibiting grain growth due to recovery and recrystallization in the hot-rolling step to provide desired ferrite grain size (1 to 50 μm), and may be contained as needed. At a Nb content of less than 0.001%, these effects are not provided. At a Nb content of more than 0.15%, coarse precipitates are precipitated in a surface layer portion by strain-induced precipitation during hot rolling to decrease fine precipitates in the surface layer portion, thereby decreasing the fatigue crack growth resistance properties in the plastic strain range. Thus, the upper limit thereof is 0.15%. Accordingly, when Nb is contained, the Nb content is 0.001% to 0.15%. More preferably, the Nb content is 0.001% to 0.009%.

V: 0.001% to 0.15%

V precipitates as carbide, is effective in inhibiting grain growth due to recovery and recrystallization in the hot-rolling step to provide desired ferrite grain size (1 to 50 μm), and may be contained as needed. At a V content of less than 0.001%, these effects are not provided. At a V content of more than 0.15%, coarse precipitates are precipitated in a surface layer portion by strain-induced precipitation during hot rolling to decrease fine precipitates in the surface layer portion, thereby decreasing the fatigue crack growth resistance properties in the plastic strain range. Thus, the upper limit thereof is 0.15%. Accordingly, when V is contained, the V content is 0.001% to 0.15%. More preferably, the V content is 0.001% to 0.049%.

W: 0.001% to 0.15%

W precipitates as carbide, serves to complement the effect of inhibiting grain growth due to recovery and recrystallization in the hot-rolling step to provide desired ferrite grain size (1 to 50 μm), and may be contained as needed. At a W content of less than 0.001%, these effects are not provided. At a W content of more than 0.15%, coarse precipitates are precipitated in a surface layer portion by strain-induced precipitation during hot rolling to decrease fine precipitates in the surface layer portion, thereby decreasing the fatigue crack growth resistance properties in the plastic strain range. Thus, the upper limit thereof is 0.15%. Accordingly, when W is contained, the W content is 0.001% to 0.15%. More preferably, the W content is 0.001% to 0.049%.

Mo: 0.001% to 0.45%

Mo serves to ensure desired strength by low-temperature transformation strengthening or precipitation strengthening during the post-heat treatment and improving the fatigue crack growth resistance properties in the plastic strain range and may be contained as needed. At a Mo content of less than 0.001%, the effect is not provided. At a Mo content of more than 0.45%, the weldability is deteriorated. Accordingly, when Mo is contained, the Mo content is 0.001% to 0.45%. More preferably, the Mo content is 0.001% to 0.30%.

Cu: 0.001% to 0.45%, Ni: 0.001% to 0.45%

Cu and Ni are elements serving to complement the effect of improving the fatigue strength of Mn and are effective in enhancing the corrosion resistance of a steel material. Thus, Cu and Ni may each be contained as needed. These effects are provided when Cu and Ni is each contained in an amount of 0.001% or more. When Cu or Ni is contained in an amount of more than 0.45%, the weldability deteriorates. Thus, the upper limit of each of Cu and Ni is 0.45%. When Cu is contained, the Cu content is 0.001% to 0.45%. When Ni is contained, the Ni content is 0.001% to 0.45%. More preferably, each element is contained in an amount of 0.35% or less.

Ca: 0.0001% to 0.005%

Ca has what is called the shape control effect of forming elongated MnS into granular Ca(Al)S(O), is effective in inhibiting the fatigue crack initiation to improve the fatigue resistance properties, and may be contained as needed. The effect is provided at a Ca content of 0.0001% or more. At a Ca content of more than 0.005%, non-metal inclusions are increased to decrease the fatigue resistance properties. Thus, the upper limit thereof is 0.005%. Accordingly, when Ca is contained, the Ca content is 0.0001% to 0.005%.

Sb: 0.0001% to 0.10%

Sb preferentially segregates on a surface, serves to suppress the entry of N from an atmosphere in the hot-rolling step or post-heat treatment step and suppress the decrease of the addition effect of B due to the formation of BN, and may be contained as needed. The effect is provided at an Sb content of 0.0001% or more. At an Sb content of more than 0.10%, the effect is saturated. Thus, the upper limit is 0.10%. Accordingly, when Sb is contained, the Sb content is 0.0001% to 0.10%. More preferably, the Sb content is 0.0001% to 0.030%.

Preferably, the steel member according to aspects of the present invention has a microstructure in which a ferrite phase extending from a surface to a depth of 200 μm in the thickness direction after the post-heat treatment has an average grain size of 1 to 50 μm and Ti carbide having a particle size of 1.0 to 20 nm is precipitated in the ferrite phase extending from a surface to a depth of 200 μm in the thickness direction, in which a difference (absolute value) between the average hardness of a portion extending from the surface to a depth of 200 μm in the thickness direction and the average hardness in the vicinity of the center in the thickness direction, excluding a center segregation portion, is ΔHV 50 points or less in terms of Vickers hardness (HV).

The microstructure of the steel member, the precipitation state of precipitates, and the cross-sectional hardness are important in achieving good fatigue crack growth resistance properties in the plastic strain range. In the case where the ferrite phase extending from the surface to a depth of 200 μm in the thickness direction after the post-heat treatment has an average grain size of more than 50 μm, a large initial fatigue crack is formed early, thus making it difficult to ensure desired fatigue crack growth resistance properties in the plastic strain range. It is industrially and economically difficult to achieve an average grain size of the ferrite phase of less than 1 μm after the post-heat treatment. Thus, the lower limit thereof is set thereto.

The ferrite phase used here refers to matrix iron phase with a body-centered cubic lattice and includes polygonal ferrite, acicular ferrite, Widmanstatten ferrite, bainitic ferrite, bainite, and low-carbon (C content: 1% or less) martensite structure. Examples of a secondary phase other than the ferrite phase include austenite, carbide, pearlite, and high-carbon martensite (C content: more than 1%).

The main phase of the microstructure of the steel member according to aspects of the present invention is preferably the ferrite phase. The "main phase" used here refers to a phase that constitutes, on a percent by volume basis, 51% or more, preferably 80% or more, and may be 100%.

The dimensions of Ti carbide in the ferrite phase extending from the surface to a depth of 200 μm in the thickness direction are important in achieving high surface hardness and good fatigue resistance properties in the plastic strain range. The precipitation of Ti carbide having a particle size of 1.0 to 20 nm in the ferrite phase extending from the surface to a depth of 200 μm in the thickness direction inhibits the generation of an initial fatigue crack and reduces the size of the initial fatigue crack, thereby further improving the fatigue crack growth resistance properties in the plastic strain range. The amount of Ti carbide precipitated with a particle size of 1.0 to 20 nm is not particularly specified. In addition to Ti carbide having a particle size of 1.0 to 20 nm, the precipitation of Ti carbide having different dimensions is acceptable.

The fact that the difference between the average hardness of the portion extending from the surface to a depth of 200 μm in the thickness direction and the average hardness in the vicinity of the center in the thickness direction, excluding the center segregation portion, is ΔHV 50 points or less is important in achieving good fatigue crack growth resistance properties in the plastic strain range. When the difference between the average hardness of the portion extending from the surface to a depth of 200 μm in the thickness direction and the average hardness in the vicinity of the center in the thickness direction, excluding the center segregation portion is more than ΔHV 50 points, a large initial fatigue crack is formed early, thereby making it difficult to ensure desired fatigue crack growth resistance properties in the plastic strain range. Thus, the difference between the average hardness of the portion extending from the surface to a depth of 200 μm in the thickness direction and the average hardness in the vicinity of the center in the thickness direction, excluding the center segregation portion, is preferably ΔHV 50 points or less.

The difference between the average hardness of the portion extending from the surface to a depth of 200 μm in the thickness direction and the average hardness in the vicinity of the center in the thickness direction, excluding the center segregation portion, was determined as follows: The micro-Vickers hardness values (HV(0.1)) at seven points located 25 μm apart from each other in the thickness direction in a portion extending from a depth of 50 μm to a depth of 200 μm were measured at a load of 0.1 kgf, and the average $HV(0.1)_s$ of the values was calculated. The micro-Vickers hardness values (HV(0.1)) at seven points located 25 μm apart from each other in the thickness direction in a central portion, excluding the center segregation portion, were measured, and the average $HV(0.1)_c$ thereof was calculated. Then the difference between the average $HV(0.1)_s$ and the average $HV(0.1)_c$, i.e., $HV(0.1)_c - HV(0.1)_s$, was calculated.

(Material Hot-Rolled Steel Sheet)

The hot-rolled steel sheet (material hot-rolled steel sheet) for the steel member according to aspects of the present invention is particularly preferred in order to provide the steel member according to aspects of the present invention.

The material hot-rolled steel sheet according to aspects of the present invention contains, on a percent by mass basis, 0.010% to 0.120% Ti, in which 0.005% or more of Ti is present as dissolved Ti in the microstructure. After the predetermined heat treatment subsequent to the forming processing, 0.005% or more of Ti can be precipitated as fine precipitates having a particle size of 20 nm or less in the microstructure of a steel member. This makes it possible to provide the steel member having good fatigue crack growth resistance properties in the plastic strain range and good strength properties.

The material hot-rolled steel sheet according to aspects of the present invention has the same composition as the steel member.

The leading end portion and the trailing end portion of the material hot-rolled steel sheet according to aspects of the present invention are both end portions in the longitudinal direction, and preferably, each of the leading end portion and the trailing end portion has a thickness 5% to 50% larger than an intermediate portion (central portion in the longitudinal direction) other than the both end portions in the longitudinal direction. Thus, in the case where, like coiled tubing, after the material hot-rolled steel sheet is slit into strips with a predetermined width, the strips are bonded by welding in the longitudinal direction, the effect of improving the fatigue crack growth resistance properties in the plastic strain range of a weld zone is enhanced.

(Production Method)

A method for producing a steel member according to aspects of the present invention and a method for producing a hot-rolled steel sheet serving as a material of the steel member will be described below. A temperature used in the following description is a surface temperature of a steel slab, unless otherwise specified.

In accordance with aspects of the present invention, a steel slab produced by casting a steel having the composition described above is used as a starting material. A method for producing the starting material is not particularly limited. An example thereof is a method in which a molten steel having the composition described above is made by a common method with a converter or the like and then formed into a steel slab by a common casting method such as a continuous casting process.

A method for producing a hot-rolled steel sheet (material hot-rolled steel sheet) serving as a material of a steel member according to aspects of the present invention will first be described.

The material hot-rolled steel sheet according to aspects of the present invention can be produced by hot-rolling a steel slab containing 0.010% to 0.120% Ti under predetermined conditions.

Slab Extraction at Temperature Higher than Equilibrium Dissolution Temperature $T_{Ti}$ Calculated from $\log([Ti-N\times 48/14][C])=-7,000/(T_{Ti}(°C.)+273)+2.75$ A slab extraction temperature in a hot-rolling step affects the size of precipitates and the amount of dissolved Ti after the hot rolling in accordance with the state of re-dissolution or precipitation of Ti in steel and thus is important in ensuring good fatigue resistance properties after post-heat treatment. When the extraction temperature is equal to or lower than the equilibrium dissolution temperature $T_{Ti}$ calculated from formula (1) below, coarse Ti precipitated during continuous casting is left as undissolved carbonitride. The amount of dissolved Ti is less than 0.005% in the stage of a material hot-rolled steel sheet, thereby failing to provide excellent fatigue crack growth resistance properties in the plastic strain range after the post-heat treatment. When slab is extracted at a temperature higher than the equilibrium dissolution temperature $T_{Ti}$ calculated from formula (1) below, 0.005% or more of Ti is present as dissolved Ti in the stage of the material hot-rolled steel sheet. Heat treatment subsequent to forming processing enables 0.005% or more of Ti to be precipitated as fine precipitates having a particle size of 20 nm or less, thereby providing excellent fatigue crack growth resistance properties in the plastic strain range. More preferably, the slab extraction temperature is preferably 1,620 K or lower from the viewpoint of preventing an increase in grain size, and a slab soaking time (time to hold the slab at a temperature higher than the equilibrium dissolution temperature $T_{Ti}$) is preferably 10 minutes or more from the viewpoint of ensuring a uniform dissolution state of Ti and a sufficient dissolution time.

$$\log([Ti-N\times 48\div 14][C])=-7,000/(T_{Ti}(°C.)+273)+2.75 \quad (1)$$

where Ti, N, and C in formula (1) indicate contents (% by mass) of respective elements in the steel slab.

Finish Rolling Temperature Equal to or Higher than $T_{Ti}-400°$ C.

When the finish rolling temperature in the hot rolling is lower than $T_{Ti}-400°$ C., additional shear strain due to upper and lower rolls in portions near surfaces or strain-induced precipitation due to heat removal by rolls and cooling water is induced. In particular, the amount of dissolved Ti present in portions (extending from the front and back surfaces to a depth of 200 μm) near the surfaces is lower than 0.005% in the stage of the material hot-rolled steel sheet, thereby failing to provide excellent fatigue crack growth resistance properties in the plastic strain range after the post-heat treatment. When the finish rolling temperature in the hot rolling is equal to or higher than $T_{Ti}-400°$ C., 0.005% or more of Ti is present as dissolved Ti in the portions near the surfaces in the stage of the material hot-rolled steel sheet. The heat treatment subsequent to the forming processing enables 0.005% or more of Ti to be precipitated as fine precipitates having a particle size of 20 nm or less, thereby providing excellent fatigue crack growth resistance properties in the plastic strain range.

Cooling at Average Cooling Rate of 10° C./s or More in Temperature Range of $T_{Ti}-400°$ C. to $T_{Ti}-500°$ C.

When the average cooling rate in the temperature range of $T_{Ti}-400°$ C. to $T_{Ti}-500°$ C. is lower than 10° C./s, TiC precipitates in the course of hot-rolling runout to coiling, and the amount of dissolved Ti present in the stage of the material hot-rolled steel sheet is lower than 0.005%, thereby failing to provide excellent fatigue crack growth resistance properties in the plastic strain range after the post-heat treatment. When rapid cooling is performed at an average cooling rate of 10° C./s or more in the temperature range of $T_{Ti}-400°$ C. to $T_{Ti}-500°$ C., 0.005% or more of Ti is present as dissolved Ti in the portions near the surfaces in the stage of the material hot-rolled steel sheet. The heat treatment subsequent to the forming processing enables 0.005% or more of Ti to be precipitated as fine precipitates having a particle size of 20 nm or less, thereby providing excellent fatigue crack growth resistance properties in the plastic strain range.

Coiling Temperature Equal to or Lower than $T_{Ti}-500°$ C.

When the coiling temperature is higher than $T_{Ti}-500°$ C., the precipitation of Ti precipitates is promoted until coil is cooled. The amount of dissolved Ti present in the stage of the material hot-rolled steel sheet is less than 0.005%, thereby failing to provide excellent fatigue crack growth resistance properties in the plastic strain range. When the coiling temperature is equal to or lower than $T_{Ti}-500°$ C., 0.005% or more of Ti is present as dissolved Ti in the portions near the surfaces in the stage of the material hot-rolled steel sheet. The heat treatment subsequent to the forming processing enables 0.005% or more of Ti to be precipitated as fine precipitates having a particle size of 20 nm or less, thereby providing excellent fatigue crack growth resistance properties in the plastic strain range. The finish rolling temperature and the coiling temperature are a surface temperature in the central portion of the coil in the width direction. The average cooling rate is determined from the surface temperature.

By the production method, a hot-rolled steel sheet (material hot-rolled steel sheet) in which 0.005% or more Ti is present as dissolved Ti in the microstructure is obtained.

A method for producing a steel member according to aspects of the present invention will be described below.

The steel member according to aspects of the present invention is produced by subjecting the material hot-rolled steel sheet to forming processing and then performing predetermined heat treatment. The forming processing is not particularly limited. For example, when the steel member is a steel pipe, pipe making is exemplified. When the steel member is a welded steel pipe, welding may be performed after the pipe making. For example, when the steel member is a formed component such as automotive structural member, press working and so forth are exemplified.

After the forming processing, heat treatment is performed under conditions described below.

After Heating to Temperature Higher than 550° C. and 1,050° C. or Lower, Cooling at Average Cooling Rate of 10° C./s or More in Temperature Range of 550° C. to 400° C.

The material hot-rolled steel sheet is subjected to forming processing and then heat treatment including heating to a temperature higher than 550° C. and 1,050° C. or lower and then cooling at an average cooling rate of 10° C./s or more in the temperature range of 550° C. to 400° C., so that 0.005% or more of Ti precipitates as fine precipitates having a particle size of 20 nm or less, thereby providing excellent fatigue crack growth resistance properties in the plastic strain range. When the heating temperature is 550° C. or lower, dissolved Ti does not precipitate as fine precipitates having a particle size of 20 nm or less, thereby failing to provide excellent fatigue crack growth resistance properties in the plastic strain range. When the heating temperature is higher than 1,050° C., the ferrite phase has a grain size of more than 50 μm, thus making it difficult to provide excellent fatigue crack growth resistance properties in the plastic strain range. When the cooling rate in the temperature range of 550° C. to 400° C. is less than 10° C./s, sufficient strength (YS 770 MPa) is not obtained. The heating temperature is more preferably in the range of 700° C. to 1,000° C.

In the case of producing a welded steel pipe, for example, the welded steel pipe is produced by, but not particularly limited to, the following procedure: A material hot-rolled steel sheet is slit into a predetermined width as rolled or after one or more treatments selected from pickling, cold rolling, annealing, and coating, as needed. One or more coils are joined in the longitudinal direction by welding and formed into a shape with a substantially circular cross section by roll forming or press forming. End portions are joined by, for example, high-frequency electric resistance welding or laser welding. The resulting article is heated on- or off-line to a temperature higher than 550° C. and 1,050° C. or lower, cooled at an average cooling rate of 10° C./s or more in the temperature range of 550° C. to 400° C., and coiled to provide a coiled steel pipe.

In the case of producing a formed component, for example, the formed component is produced by the following procedure: A material hot-rolled steel sheet is subjected to blanking into a predetermined size as rolled or after one or more treatments selected from pickling, cold rolling, annealing, and coating, as needed, and is subjected to forming processing into a component. The component is heated to a temperature higher than 550° C. and 1,050° C. or lower and cooled at an average cooling rate of 10° C./s or more in the temperature range of 550° C. to 400° C. Thereby, 0.005% or more of Ti precipitates as fine precipitates having a particle size of 20 nm or less, thus providing excellent fatigue crack growth resistance properties in the plastic strain range.

EXAMPLES

Example 1

Steel slabs having compositions (types of steels: C to K) presented in. Table 1 were extracted from a heating furnace at a slab surface temperature of about 1,220° C. and a slab center temperature of about 1,210° C. The steel slabs were subjected to hot rolling including a finish rolling reduction of 91%, a finish rolling temperature of about 860° C. in the central portion of the coil in the width direction, a minimum finish rolling temperature of about 850° C. in the central portion of the coil in the width direction, cooling at an average cooling rate of about 20° C./s in the temperature range of $T_{fr}$–400° C. to $T_{fr}$–500° C., and a coiling temperature of about 560° C., thereby providing material hot-rolled steel sheets (Nos. 3 to 11) (thickness: about 5 mm, the leading and trailing end portions having a thickness about 10% larger than the central portion in the longitudinal direction).

Material hot-rolled steel sheets (Nos. 1 and 12) were produced in the same manner as above, except that the coiling temperature of steel slabs having compositions (types of steels: A and L) presented in Table 1 was about 400° C. Material hot-rolled steel sheets (Nos. 2 and 13) were produced in the same manner as above, except that steel slabs having compositions (types of steels: B and M) presented in Table 1 were extracted from the heating furnace at a slab surface temperature of about 1,335° C. and a slab center temperature of about 1,335° C. and the finish rolling temperature of the central portion of the coil in the width direction was about 940° C.

These material hot-rolled steel sheets were pickled, slit into a predetermined width dimension, and continuously formed into open pipes. The open pipes were subjected to electric resistance welding by high-frequency resistance welding to form welded steel pipes having an outside diameter of 50.8 mm and a thickness of about 5 mm at a width drawing rate of 4%. The entirety of each of the welded steel pipes were subjected to heat treatment including continuous high-frequency heating to a heating temperature of 920° C. for a holding time of about 5 seconds and then mist cooling with water from the outer surface at an average cooling rate of about 50° C./s in the temperature range of 550° C. to 400° C.

Test pieces were collected from these welded steel pipes. A microstructure observation test, quantitative tests for precipitates and the amount dissolved, a tensile test, a fatigue test in a plastic strain range, and a low-temperature toughness test were performed. Test methods were described below.

(1) Microstructure Observation Test

Test pieces for microstructure observation were collected in such a manner that sections of the welded steel pipes in the circumferential direction served as observation surfaces. The test pieces were polished and etched with nital. The Microstructures were observed with a scanning electron microscope (×3,000). A boundary when the tilt angle between adjacent grains was 15° or more was defined as a grain boundary, and the average grain size of a ferrite phase was determined by an electron backscatter diffraction (EBSD) technique. As an average grain size in a portion extending from a surface to a depth of 200 μm in the thickness direction, a value was determined by measuring grain sizes at three points located 50 μm apart from each other in the thickness direction in a portion extending from a depth of 50 to a depth of 200 μm and averaging the resulting grain sizes, and a value was determined by measuring grain sizes at three points located 50 μm apart from each other in the thickness direction in a central portion, excluding the center segregation portion, and averaging the resulting grain sizes.

(2) Quantitative Test for Precipitate and Amount Dissolved

Test pieces having a size of 20 mm×30 mm were cut from these welded steel pipes. Each of the test pieces was subjected to constant-current electrolysis at a current density of 20 mA/cm$^2$ in a 10% AA-containing electrolytic solution (10% by volume of acetylacetone-1% by mass of tetramethylammonium chloride-methanol) so as to be reduced in weight by about 0.2 g. After the electrolysis, the test piece having surfaces to which precipitates adhere was taken out of the electrolytic solution and immersed in an aqueous solution of sodium hexametaphosphate (500 mg/l) (hereinafter, referred to as an "aqueous solution of SHMP"). Ultrasonic vibration was applied thereto to separate the precipitates from the test piece. The separated precipitates were collected in the aqueous solution of SHMP. The aqueous solution of SHMP containing the precipitates was filtered with a filter having a pore size of 100 nm and then a filter having a pore size of 20 nm in this order. After the filtration, the residues on the filters and the filtrate were analyzed with an ICP emission spectrometer. The absolute amounts of Ti in the residues on the filters and in the filtrate were measured to determine Tilp, which was the absolute amount of Ti in the precipitates having a particle size of more than 100 nm, Timp, which was the absolute amount of Ti in the precipitates having a particle size of 100 nm or less and more than 20 nm, and Tisp, which was the absolute amount of Ti in the precipitates having a particle size of 20 nm or less. The mass reduced by the electrolysis was determined by measuring the mass of the test piece after the separation of the precipitates and subtracting the resulting mass from the mass of the test piece before electrolysis.

The content of Ti in a dissolved state (dissolved Ti) was determined as follows: The electrolytic solution after the electrolysis was used as a solution for analysis. The concentrations of Ti and Fe serving as a reference element in the solution were measured by ICP mass spectrometry. The concentration ratio of Ti to Fe was calculated on the basis of the resulting concentrations. The ratio was multiplied by the Fe content of the test piece to determine the dissolved Ti content. The Fe content of the test piece can be determined by subtracting the total content of elements other than Fe from 100%. The quantitative tests for the precipitates and the amount dissolved were also performed on the welded steel pipes before the post-heat treatment in addition to the welded steel pipes after the post-heat treatment.

(3) Tensile Test

JIS No. 12 test pieces were cut from these welded steel pipes in accordance with JIS Z 2201 in such a manner that the L-direction coincided with a tensile direction. The tensile test was performed in accordance with JIS Z 2241 to determine tensile properties (tensile strength TS, yield strength YS, and total elongation El).

(4) Fatigue Test in Plastic Strain Range

Flat-plate L-direction fatigue test specimens each having a 12-mm-long parallel portion with cross-sectional dimensions measuring about 5 mm in thickness×5 mm in width were collected from these welded steel pipes after leveling. A fatigue test was performed under conditions of a tensile mode, a strain control mode, a strain ratio of 0, a total strain range of 2.0%, and a number of cycles of 0.125 Hz. The number of cycles from a 12.5% decrease in maximum tensile load to a 25% decrease in maximum tensile load relative to the initial load was determined and was used as an index of fatigue crack growth resistance properties in a plastic strain range.

(5) Low-Temperature Toughness Test

Each of the welded steel pipes was uncoiled in such a manner that the longitudinal direction of the pipe (L-direction) coincided with the length of a specimen. A Charpy specimen (2 mm V-notch, ½ size) was cut out in accordance with JIS Z 2202. A Charpy impact test was performed in accordance with JIS Z 2242. The fracture appearance transition temperature was determined to evaluate the low-temperature toughness.

The average hardness $(HV(0.1)_s)$ of a portion extending from a surface to a depth of 200 μm in the thickness direction and the average hardness $(HV(0.1)_c)$ in the vicinity of the center in the thickness direction, excluding a center segregation portion, were measured by the foregoing method. A difference between the average hardness of the portion extending from the surface to a depth of 200 μm in the thickness direction and the average hardness in the vicinity of the center in the thickness direction, excluding the center segregation portion, i.e., $\Delta HV$ $(HV(0.1)_c - HV(0.1)_s)$, was calculated.

Table 2 presents the results.

TABLE 1

| No. | Type of steel | Chemical composition (% by mass) | | | | | | | | | | |
|---|---|---|---|---|---|---|---|---|---|---|---|---|
| | | Ti | C | Si | Mn | Al | Cr | B | P | S | N | O |
| 1 | A | 0.013 | 0.12 | 0.004 | 0.46 | 0.043 | 0.003 | 0.0003 | 0.006 | 0.0006 | 0.0014 | 0.0006 |
| 2 | B | 0.112 | 0.28 | 1.43 | 2.42 | 0.074 | 0.85 | 0.0044 | 0.018 | 0.014 | 0.0075 | 0.0026 |
| 3 | C | 0.043 | 0.25 | 0.23 | 1.30 | 0.048 | 0.19 | 0.0023 | 0.009 | 0.005 | 0.0033 | 0.0012 |
| 4 | D | 0.043 | 0.25 | 0.23 | 1.30 | 0.048 | 0.19 | 0.0023 | 0.009 | 0.005 | 0.0033 | 0.0012 |
| 5 | E | 0.043 | 0.25 | 0.23 | 1.30 | 0.048 | 0.19 | 0.0023 | 0.009 | 0.005 | 0.0033 | 0.0012 |
| 6 | F | 0.043 | 0.25 | 0.23 | 1.30 | 0.048 | 0.19 | 0.0023 | 0.009 | 0.005 | 0.0033 | 0.0012 |
| 7 | G | 0.043 | 0.25 | 0.23 | 1.30 | 0.048 | 0.19 | 0.0023 | 0.009 | 0.005 | 0.0033 | 0.0012 |
| 8 | H | 0.043 | 0.25 | 0.23 | 1.30 | 0.048 | 0.19 | 0.0023 | 0.009 | 0.005 | 0.0033 | 0.0012 |
| 9 | I | 0.043 | 0.25 | 0.23 | 1.30 | 0.048 | 0.19 | 0.0023 | 0.009 | 0.005 | 0.0033 | 0.0012 |
| 10 | J | 0.043 | 0.25 | 0.23 | 1.30 | 0.048 | 0.19 | 0.0023 | 0.009 | 0.005 | 0.0033 | 0.0012 |
| 11 | K | 0.043 | 0.25 | 0.23 | 1.30 | 0.048 | 0.19 | 0.0023 | 0.009 | 0.005 | 0.0033 | 0.0012 |
| 12 | L | 0.009 | 0.25 | 0.23 | 1.30 | 0.048 | 0.19 | 0.0023 | 0.009 | 0.005 | 0.0014 | 0.0012 |
| 13 | M | 0.132 | 0.25 | 0.23 | 1.30 | 0.048 | 0.19 | 0.0023 | 0.009 | 0.005 | 0.0033 | 0.0012 |

| No. | Chemical composition (% by mass) | | Equilibrium dissolution temperature (° C.) $T_{Ti}$ | $T_{Ti} - 400$ (° C.) | $T_{Ti} - 500$ (° C.) | Class |
|---|---|---|---|---|---|---|
| | Sn | Others | | | | |
| 1 | — | — | 943 | 543 | 443 | Steel of |
| 2 | 0.092 | — | 1330 | 930 | 830 | present |
| 3 | 0.002 | — | 1170 | 770 | 670 | invention |
| 4 | 0.002 | Nb: 0.007 | 1170 | 770 | 670 | |
| 5 | 0.002 | V: 0.023 | 1170 | 770 | 670 | |
| 6 | 0.002 | W: 0.003 | 1170 | 770 | 670 | |
| 7 | 0.002 | Mo: 0.25 | 1170 | 770 | 670 | |
| 8 | 0.002 | Cu: 0.24 | 1170 | 770 | 670 | |
| 9 | 0.002 | Ni: 0.18 | 1170 | 770 | 670 | |
| 10 | 0.002 | Ca: 0.0023 | 1170 | 770 | 670 | |
| 11 | 0.002 | Sb: 0.008 | 1170 | 770 | 670 | |

TABLE 1-continued

| | 12 | 0.002 | — | | 949 | 549 | 449 | Comparative |
| | 13 | 0.002 | — | | 1366 | 966 | 866 | steel |

Underlined values are outside the range of the present invention.

TABLE 2

| No | Type of steel | Average grain size of ferrite phase (μm) Surface to 200 μm | Average grain size of ferrite phase (μm) Central portion in thickness direction | Vickers hardness HV (0.1)$_c$ | Vickers hardness ΔHV | Amount of dissolved Ti (% by mass) Before post-heat treatment | Amount of dissolved Ti (% by mass) After post-heat treatment | Amount of Ti in precipitate (% by mass) ≤20 nm | Amount of Ti in precipitate (% by mass) More than 20 nm to 100 nm or less |
|---|---|---|---|---|---|---|---|---|---|
| 1 | A | 47 | 45 | 270 | 20 | 0.005 | 0.000 | 0.005 | 0.004 |
| 2 | B | 2 | 1 | 370 | 0 | 0.045 | 0.022 | 0.025 | 0.034 |
| 3 | C | 7 | 6 | 340 | 10 | 0.014 | 0.004 | 0.014 | 0.019 |
| 4 | D | 4 | 2 | 350 | 10 | 0.011 | 0.002 | 0.010 | 0.024 |
| 5 | E | 6 | 6 | 360 | 10 | 0.012 | 0.003 | 0.013 | 0.022 |
| 6 | F | 6 | 6 | 350 | 10 | 0.012 | 0.003 | 0.013 | 0.022 |
| 7 | G | 4 | 3 | 400 | 10 | 0.011 | 0.001 | 0.011 | 0.023 |
| 8 | H | 6 | 5 | 350 | 10 | 0.012 | 0.003 | 0.013 | 0.022 |
| 9 | I | 6 | 5 | 350 | 10 | 0.012 | 0.003 | 0.013 | 0.022 |
| 10 | J | 7 | 6 | 340 | 10 | 0.012 | 0.003 | 0.013 | 0.022 |
| 11 | K | 6 | 6 | 380 | 10 | 0.012 | 0.003 | 0.013 | 0.022 |
| 12 | L | 62 | 55 | 280 | 80 | 0.003 | 0.000 | 0.003 | 0.002 |
| 13 | M | 4 | 3 | 280 | 60 | 0.066 | 0.043 | 0.025 | 0.029 |

| No. | Amount of Ti in precipitate (% by mass) >100 nm | Tensile properties YS (MPa) | Tensile properties TS (MPa) | Tensile properties El (%) | Fatigue crack growth resistance properties (cycle) | Charpy fracture transition temperature (° C.) | Class |
|---|---|---|---|---|---|---|---|
| 1 | 0.004 | 772 | 858 | 14 | 123 | −70 | Example |
| 2 | 0.031 | 1078 | 1198 | 10 | 145 | −30 | Example |
| 3 | 0.006 | 976 | 1084 | 11 | 205 | −65 | Example |
| 4 | 0.007 | 1018 | 1131 | 11 | 176 | −70 | Example |
| 5 | 0.004 | 1032 | 1147 | 10 | 187 | −60 | Example |
| 6 | 0.004 | 1015 | 1128 | 11 | 167 | −60 | Example |
| 7 | 0.008 | 1142 | 1269 | 9 | 134 | −50 | Example |
| 8 | 0.004 | 1007 | 1119 | 11 | 177 | −55 | Example |
| 9 | 0.004 | 1005 | 1116 | 11 | 182 | −65 | Example |
| 10 | 0.004 | 973 | 1081 | 11 | 202 | −70 | Example |
| 11 | 0.004 | 1089 | 1210 | 10 | 144 | −55 | Example |
| 12 | 0.004 | 887 | 986 | 12 | 34 | −25 | Comparative example |
| 13 | 0.035 | 900 | 1000 | 12 | 42 | −10 | Comparative example |

Underlined values are outside the range of the present invention.

In each of the examples (Nos. 1 to 11) of the present invention, the number of cycles in the fatigue test in the plastic strain range is 100 or more cycles, which indicates good fatigue crack growth resistance properties in the plastic strain range. In each of the examples of the present invention, YS is 770 MPa or more, which indicates good strength properties. In each of the examples of the present invention, the Charpy fracture appearance transition temperature is −30° C. or lower, which indicates good low-temperature toughness. In contrast, in No. 12, in which the component composition of the steel does not satisfy the range of the present invention and less than 0.005% of Ti is precipitated as precipitates having a particle size of 20 nm or less, and No. 13, in which the component composition of the steel does not satisfy the range of the present invention, desired fatigue crack growth resistance properties in the plastic strain range are not provided.

Example 2

Steel slabs having component compositions of the types of steels A, B, and C presented in Table 1 were hot-rolled under conditions presented in Table 3 to form material hot-rolled steel sheets (thickness: about 5 mm, the leading and trailing end portions having a thickness about 10% larger than the central portion in the longitudinal direction). These material hot-rolled steel sheets were pickled, slit into a predetermined width dimension, and continuously formed into open pipes. The open pipes were subjected to electric resistance welding by high-frequency resistance welding to form welded steel pipes having an outside diameter of 50.8 mm and a thickness of about 5 mm at a width drawing rate of 4%. The entirety of each of the welded steel pipes was subjected to heat treatment including continuous high-frequency heating under conditions presented in Table 3. Test pieces were collected from these welded steel pipes. A microstructure observation test, quantitative tests for precipitates and the amount dissolved, a tensile test, a fatigue test in a plastic strain range, a low-temperature toughness test, and Vickers hardness measurement were performed.

Regarding No. 23, a material hot-rolled steel sheet was subjected to pickling, blanking into a predetermined size, and press working to form a formed component. The formed component was heat-treated under conditions presented in Table 3. Test pieces were collected from the formed component, and the tests described above were performed.

Table 4 presents the results. Table 3 and 4 also present the results of Nos. 1 to 3.

TABLE 3

| No. | Type of steel | Equilibrium dissolution temperature $T_{Ti}$ (° C.) | $T_{Ti} - 400$ (° C.) | $T_{Ti} - 500$ (° C.) | Hot-rolling conditions Slab extraction temperature (surface) (° C.) | Finishing temperature (° C.) | Average cooling rate*1 (° C./s) | Coiling temperature (° C.) |
|---|---|---|---|---|---|---|---|---|
| 1  | A | 943  | 543 | 443 | 1220 | 860 | 20 | 400 |
| 14 | A | 943  | 543 | 443 | 1220 | 860 | <u>5</u> | 400 |
| 15 | A | 943  | 543 | 443 | 1220 | 860 | 20 | 400 |
| 16 | A | 943  | 543 | 443 | 1220 | 860 | 20 | 400 |
| 2  | B | 1330 | 930 | 830 | 1335 | 940 | 20 | 560 |
| 17 | B | 1330 | 930 | 830 | <u>1150</u> | 940 | 20 | 560 |
| 18 | B | 1330 | 930 | 830 | 1335 | <u>800</u> | 20 | 560 |
| 19 | B | 1330 | 930 | 830 | 1335 | 940 | 20 | 560 |
| 3  | C | 1170 | 770 | 670 | 1220 | 860 | 20 | 560 |
| 20 | C | 1170 | 770 | 670 | 1220 | 860 | 20 | <u>700</u> |
| 21 | C | 1170 | 770 | 670 | 1220 | 860 | 20 | 560 |
| 22 | C | 1170 | 770 | 670 | 1220 | 860 | 20 | 560 |
| 23 | C | 1170 | 770 | 670 | 1220 | 860 | 20 | 560 |

| No. | Post-heat treatment conditions Heating temperature (° C.) | Average cooling rate*2 (° C./s) | Remarks | Class |
|---|---|---|---|---|
| 1  | 920 | 50 | — | Example |
| 14 | 920 | 50 | — | Comparative example |
| 15 | <u>500</u> | 50 | — | Comparative example |
| 16 | 920 | <u>5</u> | — | Comparative example |
| 2  | 920 | 50 | — | Example |
| 17 | 920 | 50 | — | Comparative example |
| 18 | 920 | 50 | — | Comparative example |
| 19 | <u>1100</u> | 50 | — | Comparative example |
| 3  | 920 | 50 | — | Example |
| 20 | 920 | 50 | — | Comparative example |
| 21 | 920 | 50 | After post-heat treatment and cooling, holding at 400° C. for 60 min | Example |
| 22 | 920 | 50 | After post-heat treatment and cooling, holding at 200° C. for 10 min | Example |
| 23 | 920 | 50 | After pickling of material hot-rolled steel sheet and production of pressed component, post-heat treatment | Example |

Underlined values are outside the range of the present invention.
*1Average cooling rate in temperature range of $T_{Ti} - 400°$ C. to $T_{Ti} - 500°$ C.
*2Average cooling rate in temperature range of 550° C. to 400° C.

TABLE 4

| No. | Type of steel | Average grain size of ferrite phase (μm) | | Vickers hardness (HV) | | Amount of dissolved Ti (% by mass) | | Amount of Ti in precipitate (% by mass) | |
|---|---|---|---|---|---|---|---|---|---|
| | | Surface to 200 μm | Central portion in thickness direction | HV(0.1)$_c$ | ΔHV | Before post-heat treatment | After post-heat treatment | ≤20 nm | More than 20 nm to 100 nm or less |
| 1 | A | 47 | 45 | 270 | 20 | 0.005 | 0.000 | 0.005 | 0.004 |
| 14 | A | 76 | 55 | 180 | 60 | <u>0.001</u> | 0.000 | <u>0.001</u> | 0.009 |
| 15 | A | 32 | 29 | 210 | 70 | 0.005 | 0.005 | <u>0.001</u> | 0.003 |
| 16 | A | 70 | 60 | 150 | 60 | 0.005 | 0.002 | <u>0.002</u> | 0.005 |
| 2 | B | 2 | 1 | 370 | 0 | 0.045 | 0.022 | 0.025 | 0.034 |
| 17 | B | 2 | 1 | 280 | 80 | <u>0.003</u> | 0.001 | <u>0.003</u> | 0.038 |
| 18 | B | 4 | 1 | 290 | 80 | <u>0.004</u> | 0.001 | <u>0.003</u> | 0.070 |
| 19 | B | 63 | 57 | 320 | 80 | 0.045 | 0.003 | <u>0.002</u> | 0.068 |
| 3 | C | 7 | 6 | 340 | 10 | 0.014 | 0.004 | 0.014 | 0.019 |
| 20 | C | 20 | 18 | 280 | 80 | <u>0.001</u> | 0.001 | <u>0.001</u> | 0.031 |
| 21 | C | 7 | 6 | 340 | 10 | 0.014 | 0.002 | 0.015 | 0.019 |
| 23 | C | 7 | 6 | 330 | 10 | 0.014 | 0.004 | 0.014 | 0.019 |
| 23 | C | 7 | 6 | 340 | 10 | 0.014 | 0.004 | 0.014 | 0.019 |

| No. | Amount of Ti in precipitate (% by mass) >100 nm | Tensile properties | | | Fatigue crack growth resistance properties (cycle) | Charpy fracture appearance transition temperature (° C.) | Class |
|---|---|---|---|---|---|---|---|
| | | YS (MPa) | TS (MPa) | EI (%) | | | |
| 1 | 0.004 | 772 | 858 | 14 | 123 | −70 | Example |
| 14 | 0.003 | 581 | 646 | 19 | 66 | −25 | Comparative example |
| 15 | 0.004 | 674 | 749 | 16 | 46 | −15 | Comparative example |
| 16 | 0.004 | 564 | 627 | 19 | 55 | 0 | Comparative example |
| 2 | 0.031 | 1078 | 1198 | 10 | 145 | −30 | Example |
| 17 | 0.070 | 899 | 999 | 12 | 43 | −25 | Comparative example |
| 18 | 0.038 | 921 | 1023 | 12 | 49 | −25 | Comparative example |
| 19 | 0.039 | 997 | 1108 | 11 | 52 | 0 | Comparative example |
| 3 | 0.006 | 976 | 1084 | 11 | 205 | −65 | Example |
| 20 | 0.010 | 879 | 977 | 12 | 65 | −15 | Comparative example |
| 21 | 0.007 | 967 | 1074 | 11 | 214 | −60 | Example |
| 23 | 0.006 | 956 | 1062 | 11 | 216 | −70 | Example |
| 23 | 0.006 | 961 | 1068 | 14 | 220 | −70 | Example |

Underlined values are outside the range of the present invention.

In each of the examples (Nos. 21 to 23) of the present invention, the number of cycles in the fatigue test in the plastic strain range is 100 or more cycles, which indicates good fatigue crack growth resistance properties in the plastic strain range. In each of the examples of the present invention, YS is 770 MPa or more, which indicates good strength properties. In each of the examples of the present invention, the Charpy fracture appearance transition temperature is −30° C. or lower, which indicates good low-temperature toughness. In contrast, in Nos. 14 to 20, in which the amount of Ti precipitated as precipitates having a particle size of 20 nm or less is outside the range of the present invention, desired fatigue crack growth resistance properties in the plastic strain range are not provided.

The invention claimed is:
1. A steel member, comprising a composition consisting of, on a percent by mass basis:
C: 0.06% to 0.30%;
Si: 0.002 to 1.5%;
Mn: 0.4% to 2.5%;
Al: 0.01% to 0.19%;
Cr: 0.001% to 0.90%;
B: 0.0001% to 0.0050%;
Ti: 0.010% to 0.120%;
P: 0.019% or less (including 0%);
S: 0.015% or less (including 0%);
N: 0.008% or less (including 0%);
O: 0.003% or less (including 0%); and
Sn: 0.10% or less (including 0%),
and optionally one or two or more selected from:
Nb: 0.001% to 0.15%;
V: 0.001% to 0.15%;
W: 0.001% to 0.15%;
Mo: 0.001% to 0.45%;
Cu: 0.001% to 0.45%;
Ni: 0.001% to 0.45%;
Ca: 0.0001% to 0.005%; and
Sb: 0.0001% to 0.10%,
the balance being Fe and incidental impurities
wherein 0.005 mass % or more Ti is precipitated as a precipitate having a particle size of 20 nm or less in a microstructure, and the steel member has a Charpy fracture appearance transition temperature of −30° C. or lower.

2. The steel member according to claim 1, wherein the steel member is a welded steel pipe.

3. A method for producing the steel member according to claim 1, comprising:
subjecting a hot-rolled steel sheet to forming processing, the hot-rolled steel sheet containing the composition of claim 1, 0.005 mass % or more Ti being present as dissolved Ti in a microstructure, and then performing heat treatment including heating to a temperature of higher than 550° C. and 1,050° C. or lower and then cooling at an average cooling rate of 10° C./s or more in a temperature range of 550° C. to 400° C.

4. The method for producing the steel member according to claim 3, wherein the hot-rolled steel sheet is produced by, after performing slab extraction of a steel slab containing the composition of claim 3 at a temperature higher than an equilibrium dissolution temperature $T_{Ti}$ calculated from formula (1) below, completing finish rolling at a temperature equal to or higher than $T_{Ti}$−400° C., performing cooling at an average cooling rate of 10° C./s or more in a temperature range of $T_{Ti}$−400° C. to $T_{Ti}$−500° C., and performing coiling at a temperature equal to or lower than $T_{Ti}$−500° C., $$\log([Ti-N\times48\div14][C])=-7{,}000/(T_{Ti}(°\ C.)+273)+2.75 \qquad (1)$$

where Ti, N, and C in formula (1) indicate contents (% by mass) of respective elements in the steel slab.

5. A method for producing the steel member according to claim 2, comprising:
subjecting a hot-rolled steel sheet to forming processing, the hot-rolled steel sheet containing Ti the composition of claim 2, 0.005 mass % or more Ti being present as dissolved Ti in a microstructure, and then performing heat treatment including heating to a temperature of higher than 550° C. and 1,050° C. or lower and then cooling at an average cooling rate of 10° C./s or more in a temperature range of 550° C. to 400° C.

6. The method for producing the steel member according to claim 5, wherein the hot-rolled steel sheet is produced by, after performing slab extraction of a steel slab containing the composition of claim 5 at a temperature higher than an equilibrium dissolution temperature $T_{Ti}$ calculated from formula (1) below, completing finish rolling at a temperature equal to or higher than $T_{Ti}$−400° C., performing cooling at an average cooling rate of 10° C./s or more in a temperature range of $T_{Ti}$−400° C. to $T_{Ti}$−500° C., and performing coiling at a temperature equal to or lower than $T_{Ti}$−500° C., $$\log([Ti-N\times48\div14][C])=-7{,}000/(T_{Ti}(°\ C.)+273)+2.75 \qquad (1)$$

where Ti, N, and C in formula (1) indicate contents (% by mass) of respective elements in the steel slab.

* * * * *